Figure 1:
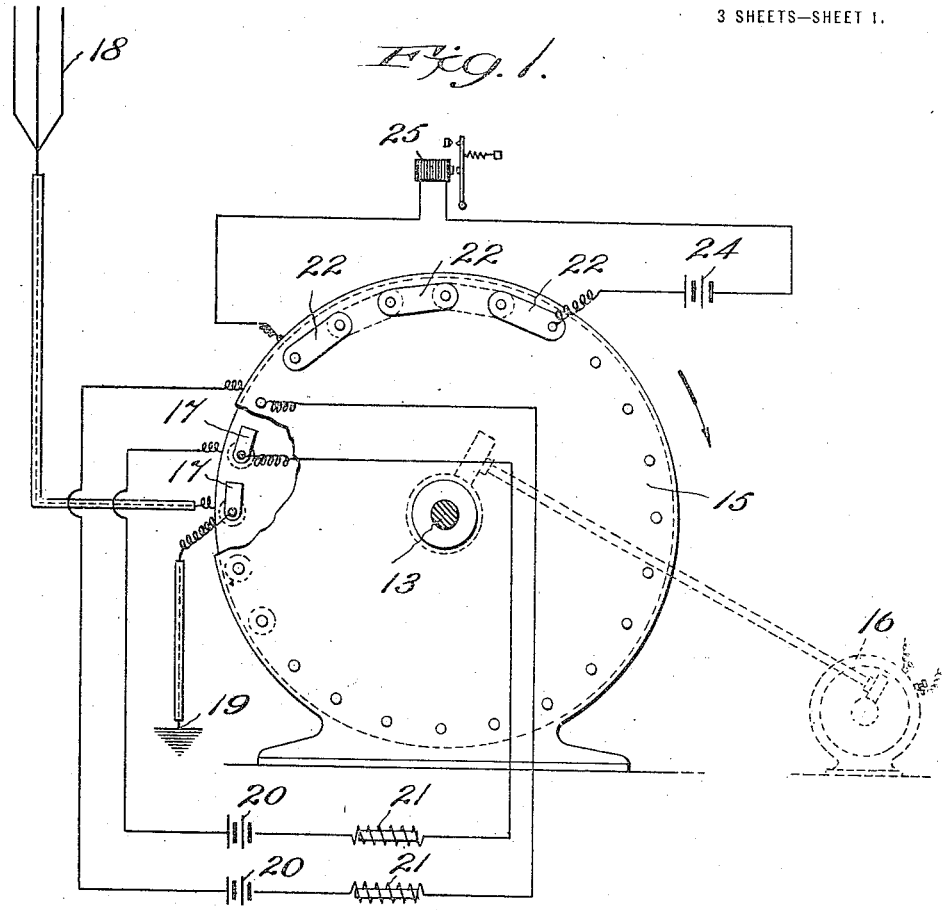

E. R. GILL.
METHOD AND APPARATUS FOR UTILIZING HERTZIAN WAVES.
APPLICATION FILED FEB. 20, 1914.

1,155,653.

Patented Oct. 5, 1915.
3 SHEETS—SHEET 1.

Edwin R. Gill
Inventor

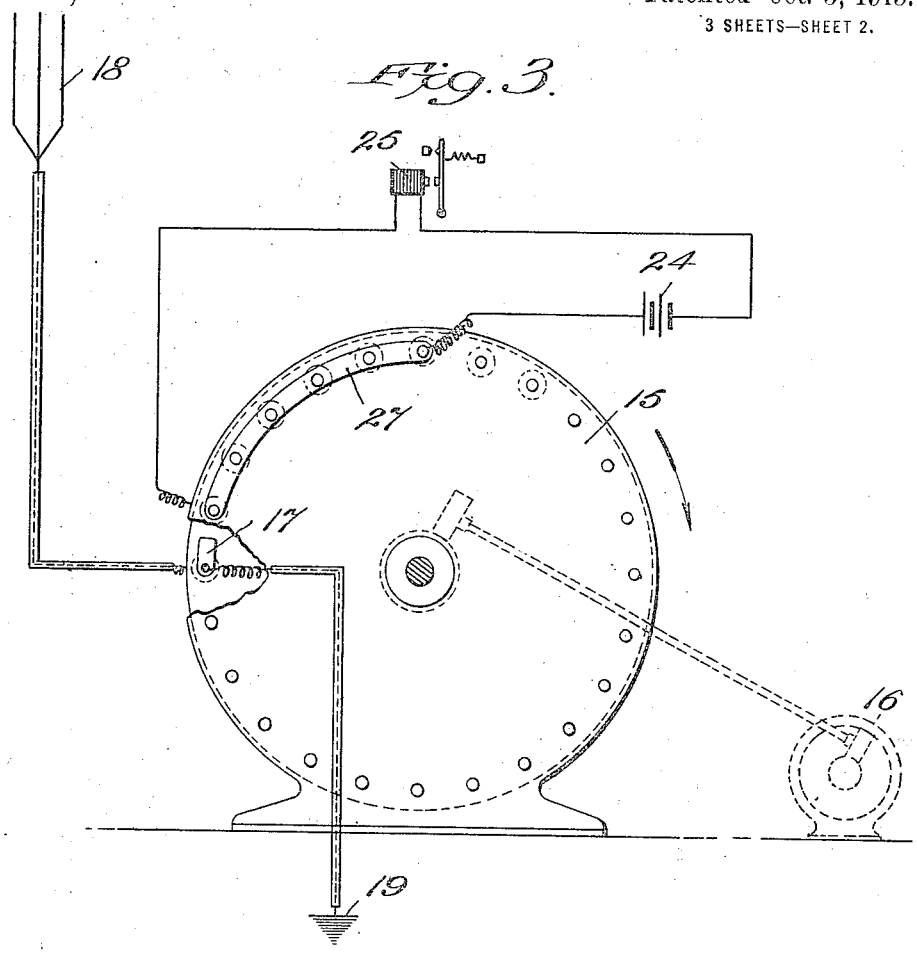
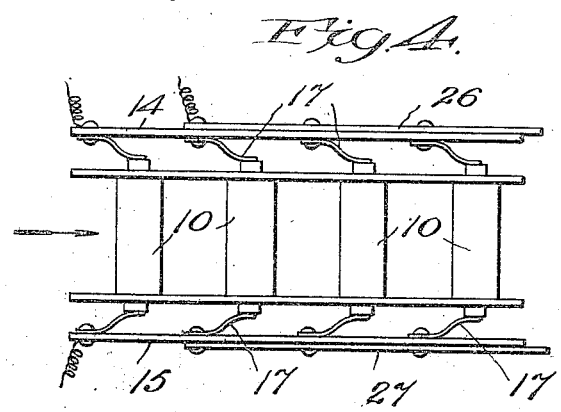

E. R. GILL.
METHOD AND APPARATUS FOR UTILIZING HERTZIAN WAVES.
APPLICATION FILED FEB. 20, 1914.

1,155,653.

Patented Oct. 5, 1915.

3 SHEETS—SHEET 3.

UNITED STATES PATENT OFFICE.

EDWIN R. GILL, OF YONKERS, NEW YORK, ASSIGNOR TO THERON McCAMPBELL.

METHOD AND APPARATUS FOR UTILIZING HERTZIAN WAVES.

1,155,653. Specification of Letters Patent. Patented Oct. 5, 1915.

Application filed February 20, 1914. Serial No. 819,886.

*To all whom it may concern:*

Be it known that I, EDWIN R. GILL, a citizen of the United States, residing at Yonkers, in the county of Westchester and State of New York, have invented certain new and useful Improvements in Methods and Apparatus for Utilizing Hertzian Waves; and I do hereby declare the following to be a full, clear, and exact description of the invention, such as will enable others skilled in the art to which it appertains to make and use the same.

The present invention relates to an improved method of utilizing the radiant energy commonly employed in so-called wireless telegraphy (herein referred to as Hertzian waves), and to a preferred apparatus for carrying out such process. Said improvement is adapted to operation of a telephone, a relay or to other translating devices for making messages intelligible, or operating mechanism at a distance from the sending station. Semaphores may be operated at a distance by this method and apparatus, torpedoes may be directed, and a great variety of other useful ends may be carried out, as will be well understood.

The method in question involves the use of a suitable number of coherers or equivalent detectors which are successively brought within the impressing influence of the aerial circuit (whatever its arrangement and constitution) after which each in turn is transferred into an incomplete receiving circuit in such a manner that, only after a suitable number of such detectors have entered such circuit, does the same become useful. The receiving circuit, being placed in operative relation with the translating device, this latter is operated by completion of said circuit. The receiving circuit may, of course, include the translating device, it may act as a short circuit for it, or any well known operative relation may be adopted.

By sending out a long continuous train of Hertzian waves from a transmitting station, while automatic apparatus at the receiving station is continuously carrying out the process above described at a predetermined rate, it is clear that after a suitable period a sufficient predetermined number of detectors will be brought cumulatively into the prepared incomplete circuit, thereby completing its usefulness and operating the translating device. In this way a universal distress signal could be sent out merely by employing a wave train, safely longer than the longest wave train employed in normal signals. Bells could thus be rung in all properly equipped receiving stations within range, thus obviating the necessity for operators to relieve each other constantly at receiving apparatus. The present method may involve introducing the impressed detectors into the receiving circuit in multiple arc or in series with each other. In either case the receiving circuit is not completed usefully until the last of the predetermined number of detectors is included in such circuit, and is then completed through all together. The former method would involve the use of a receiving circuit incapable of useful work through the high resistance offered by a single impressed coherer or equivalent detector, but capable of being made useful through the lower resistance offered by a suitable number of such coherers in multiple arc. Where the coherers are connected in series with each other, it may be that the first impression upon each coherer in succession by the aerial circuit will not sufficiently lower the resistance for use in series. It is therefore preferred to subject each coherer to a "developing" process between the aerial circuit and the receiving circuit, whereby the resistance of each is greatly lowered. This is preferably accomplished, where coherers are used, by producing through each in turn electric surgings such as result from the rupture of an electric circuit of high induction. Where detectors are used (such as the ordinary coherers) which require being subjected to treatment to restore them to virgin condition (decoherence) to prepare each to reënter the cycle of operations above outlined, this treatment should be applied preferably on open circuit and out of the influence of surgings of sufficient force to cause interference with perfect restoration to virgin condition. This takes place, of course, in each detector after it leaves the receiving circuit, and before it is again brought within the influence of the aerial circuit. The method above outlined may be carried out either by carrying the coherers or other detectors bodily through the various circuits, or by the use of suitable switches or commutators for the purpose, in a well known manner, the detectors remaining stationary.

Certain preferred forms of the invention are exemplified in the accompanying drawings, wherein—

Figure 2:
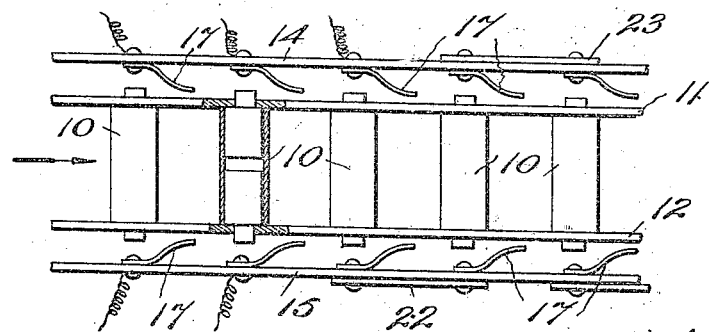
Figure 5:
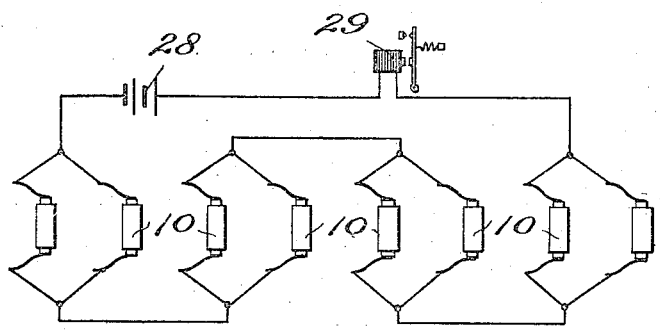
Figure 6:
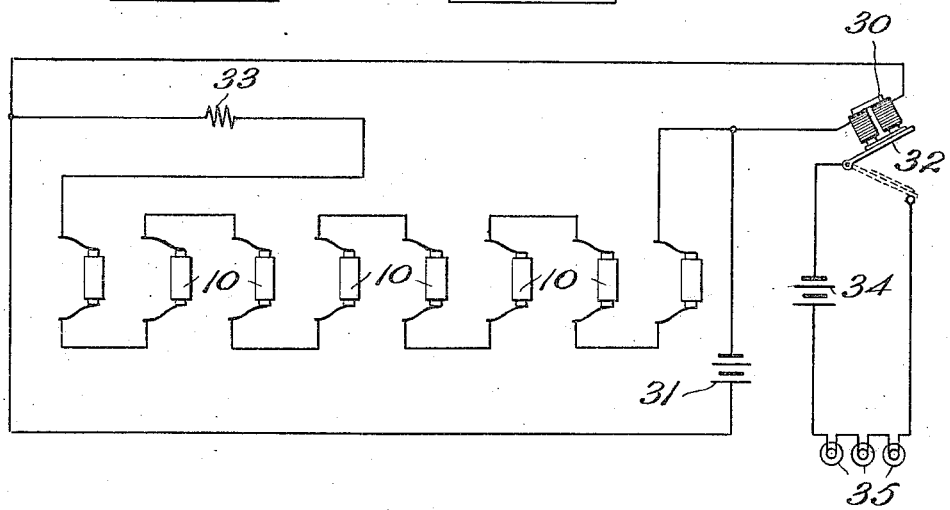

Figure 1 is a side view of an apparatus for producing series connection of the detectors, Fig. 2 is a partial top view, partly in section of the same, Fig. 3 is an apparatus for multiple arc connection in side view, Fig. 4 is a partial top view of the same, Fig. 5 illustrates in diagram modified connections which are within the invention, and Fig. 6 illustrates in diagram another modification of the possible connections.

The coherers or equivalent detectors 10 are supported by movable disks 11, 12 mounted upon a shaft 13, arranged to revolve in bearings in the stationary frame plates 14 and 15 which are preferably of insulating material. The revolution of the shaft 13 is in the direction of the arrows in Figs. 1 and 2, and may be produced in any manner as, for instance, by the electric motor 16 acting through worm gearings as indicated in dotted lines in Fig. 1. Appropriate means are mounted upon the fixed frame plates for bringing the coherers successively into the different circuits, and in the drawings these take the form of spring terminals 17 with which the extremities of the coherers 10 are adapted to come in contact as the supporting plates 11 and 12 revolve with the shaft 13. Each coherer in turn comes first into the aerial circuit connected in any suitable and well known manner with the antenna 18 and with ground 19. Where development of the impression is desired the coherer upon leaving the antenna connection is next carried into connection with one or more developing circuits, including generators 20 and induction coils 21. Any circuit which will cause electric surgings through the coherers on breaking of the circuit, or indeed any other treatment which is found appropriate to develop the coherers is within this branch of the invention. The suitably impressed coherers (whether they have been developed or not) are then brought one by one into successive contact with circuit making terminals which are electrically connected in pairs and in staggered relation, as by plates 22, 23 shown in Figs. 1 and 2. When a sufficient number of coherers have entered between the plates 22, 23 a series circuit through the same will be closed through the generator 24 and the relay 25, which is merely representative of any translating device suitable to the particular purpose in hand. It is obvious, therefore, that if a wave train is prolonged sufficiently with relation to the proportions and speed of the apparatus described, there will be placed in series with each other in the true receiving circuit a sufficient number of detectors, every one of which is suitably impressed, to close said circuit and render the same useful. If the train is not continuous, one or more of the coherers will not be impressed and the series circuit will not be completed.

In Figs. 3 and 4, the same instrumentalities are shown as in Figs. 1 and 2, save, that, instead of the succession of plates in staggered relation for closing the final circuit, I employ two continuous plates 26 and 27 on opposite sides, whereby a group of suitably impressed coherers is connected in multiple arc with the receiving circuit to render it useful. Also this form omits the developing circuits shown in Figs. 1 and 2. It will be obvious that, where a wave train is transmitted which is sufficiently long so that the successively impressed coherers will be brought into multiple arc in sufficient numbers to make the receiving circuit useful, a successful signal will be transmitted.

It is, of course, to be understood that the size of the disks will be so proportioned to the other parts that the degree of tilting of the coherers between the point of impression and the final point of usefulness will not be sufficient to decohere the same. I have found that the tilting of the coherers incident to carrying them around the circle is more than sufficient to cause decoherence, so that when they return to the aerial circuit they are ready to become useful once more.

As shown in Fig. 5 the coherers 10 may be made useful in a series multiple circuit including a generator 28 and a translating device 29.

As shown in Fig. 6, it is not essential to the invention that the actual circuit closed should be the active circuit which carries out the end in view. In this arrangement the magnet 30 is normally in circuit with the generator 31 and while so excited supports the swinging armature 32. When the coherers 10 have filled the closing circuit in series, the magnet is short-circuited through the coherers and through any suitable resistance 33 where desired, and in consequence the armature 32 drops so as to close circuit through a generator 34 and lamps 35 or other translating devices.

It will be seen that in the multiple arc arrangement shown, as well as in the series or series multiple arrangement, the circuit is not finally made useful until the last of the necessary group of detectors comes into the gap and the resistance is sufficiently lowered. It may, therefore, be properly said that the useful circuit is completed through all of the detectors together.

Various changes may be made in the above described apparatus without departing from the invention, and I do not limit myself to the details herein shown and described.

What I claim is—

1. The art of utilizing Hertzian waves for controlling an electric translating device which consists in impressing a plurality of suitable detectors successively by the influence of said waves and completing, through all of said detectors together, a useful circuit in operative electric relation with said translating device.

2. The art of utilizing Hertzian waves for controlling an electric translating device which consists in impressing a plurality of suitable detectors successively by the influence of said waves, developing this impression in each, and finally completing, through all of said detectors together, a useful circuit in operative electric relation with said translating device.

3. The art of utilizing a continuous train of Hertzian waves for controlling an electric translating device, which consists in impressing a plurality of suitable detectors successively by the influence of such train of waves during persistence thereof and completing, through all of said detectors together, a useful circuit in operative electric relation with said translating device.

4. The art of utilizing a continuous train of Hertzian waves for controlling an electric translating device which consists in impressing a plurality of suitable detectors successively by the influence of such train of waves during persistence thereof, developing this impression in each, and finally completing, through all of said detectors together, a useful circuit in operative electric relation with said translating device.

5. The art of utilizing Hertzian waves for controlling an electric translating device which consists in impressing a plurality of suitable detectors successively by the influence of said waves, and coupling said detectors in series to close a useful circuit in operative electric relation with said translating device.

6. The art of utilizing Hertzian waves for controlling an electric translating device which consists in impressing a plurality of suitable detectors successively by the influence of said waves, developing this impression in each, and finally coupling the said detectors in series to close a useful circuit in operative electric relation with said translating device.

7. The art of utilizing a continuous train of Hertzian waves for controlling an electric translating device, which consists in impressing a plurality of suitable detectors successively by the influence of such train of waves during persistence thereof, and later coupling said detectors in series to close a useful circuit in operative electric relation with said translating device.

8. The art of utilizing Hertzian waves for controlling an electric translating device which consists in impressing a plurality of coherers successively by the influence of such waves, completing a useful circuit through all of said impressed coherers together, in operative electric relation with said translating device, restoring said coherers to virgin condition and bringing them again into the field of influence of such waves.

9. The art of utilizing Hertzian waves for controlling an electric translating device which consists in impressing a plurality of coherers successively by the influence of such waves, developing the impressed condition in said coherers and completing a useful circuit, through all of said impressed coherers together, in operative relation with said translating device, restoring said coherers to virgin condition and bringing them again into the field of influence of such waves.

10. The art of utilizing Hertzian waves for controlling an electric translating device which consists in impressing a plurality of coherers successively by the influence of such waves, coupling said coherers in series to close a useful circuit in operative electric relation with said translating device, restoring said coherers to virgin condition and bringing them again into the field of influence of such waves.

11. The art of utilizing Hertzian waves for controlling an electric translating device which consists in impressing a plurality of suitable detectors successively by the influence of said waves and introducing said detectors cumulatively into a suitable circuit in operative electric relation with said translating device, until the resistance of said circuit is sufficiently lowered to complete its usefulness.

12. The art of utilizing the local circuit of a receiving station from a sending station which consists in transmitting from the latter to the former a continuous train of Hertzian waves of suitable duration while causing the individual members of a group of suitable detectors at the receiving station to pass successively first through the influence of said wave train and then cumulatively into said local circuit for a period suitably related in its duration to the duration of said wave train for closing said circuit.

13. The art of controlling the local circuit of a receiving station from a sending station which consists in transmitting from the latter to the former a continuous train of Hertzian waves of suitable duration, while causing the individual members of a group of suitable detectors at the receiving station to pass successively, first through the influence of said wave train and then into a number of gaps in series in said local circuit so as to close said local circuit after an elapsed time suitably related to the duration of said wave train.

14. Apparatus for the purpose described comprising in combination an aerial circuit for receiving Hertzian waves, a group of suitable detectors, a local circuit normally open adapted to be closed only by a plurality of said detectors, and means for connecting each detector in turn, first with said aerial circuit and then cumulatively with said local circuit for closing the latter, substantially as described.

15. Apparatus for the purpose described comprising in combination an aerial circuit for receiving Hertzian waves, a group of suitable detectors, a local circuit normally open at a number of gaps in series, and means for introducing each detector in turn first into said aerial circuit and then into each gap in the local circuit in succession until all the gaps are closed, substantially as described.

16. Apparatus for the purpose described comprising in combination an aerial circuit for receiving Hertzian waves, a group of suitable detectors, a local circuit normally open at a number of gaps in series, a developing circuit, and means for introducing each detector in turn, first into said aerial circuit, then into said developing circuit, and lastly into the various gaps in the local circuit until all the gaps are closed, substantially as described.

17. Apparatus for the purpose described comprising in combination an aerial circuit for receiving Hertzian waves, a group of suitable detectors, a local circuit normally open, adapted to be closed only by a plurality of said detectors, and movable means adapted to transport such detectors in regular order, first into connection with said aerial circuit and then cumulatively into connection with said local circuit for closing the latter, substantially as described.

18. Apparatus for the purpose described comprising in combination an aerial circuit for receiving Hertzian waves, a group of suitable detectors, a local circuit normally open at a number of gaps in series, a developing circuit, and movable means adapted to transport said detectors in regular order, first into connection with said aerial circuit, then into said developing circuit and lastly into the various gaps in said local circuit until all the gaps are closed, substantially as described.

In testimony whereof, I affix my signature, in presence of two witnesses.

EDWIN R. GILL.

Witnesses:
KATHARINE C. MEAD,
GEO. A. BYRNE.

Copies of this patent may be obtained for five cents each, by addressing the "Commissioner of Patents, Washington, D. C."